(12) United States Patent
McCune (10) Patent No.: US 10,545,730 B2
(45) Date of Patent: Jan. 28, 2020

(54) AUTOMATICALLY GENERATING CODE FOR APPLICATION PROGRAMMING INTERFACES

(71) Applicant: RED HAT, INC., Raleigh, NC (US)

(72) Inventor: Michael McCune, Detroit, MI (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/972,602

(22) Filed: May 7, 2018

(65) Prior Publication Data

US 2019/0339947 A1 Nov. 7, 2019

(51) Int. Cl.
| | |
|---|---|
| G06F 8/30 | (2018.01) |
| G06F 8/73 | (2018.01) |
| G06F 8/41 | (2018.01) |
| G06F 8/20 | (2018.01) |
| G06F 8/34 | (2018.01) |

(52) U.S. Cl.
CPC ............. *G06F 8/31* (2013.01); *G06F 8/24* (2013.01); *G06F 8/30* (2013.01); *G06F 8/34* (2013.01); *G06F 8/41* (2013.01); *G06F 8/73* (2013.01)

(58) Field of Classification Search
CPC ..... G06F 8/30; G06F 8/34; G06F 8/24; G06F 8/41; G06F 8/73; G06F 8/31
USPC ........................ 717/106, 107, 108
See application file for complete search history.

(56) References Cited

U.S. PATENT DOCUMENTS

| | | | |
|---|---|---|---|
| 8,091,071 B2 * | 1/2012 | Tsantilis ............ | G06F 8/52 714/52 |
| 8,843,945 B2 * | 9/2014 | Tran .................. | G06F 8/30 717/100 |
| 8,856,735 B2 | 10/2014 | Nimashakavi et al. | |
| 8,893,077 B1 * | 11/2014 | Aiuto ................ | G06F 8/36 717/104 |
| 9,720,800 B2 | 8/2017 | Li et al. | |
| 9,779,063 B1 * | 10/2017 | Dykema ........... | G06F 17/211 |
| 9,916,137 B2 | 3/2018 | Chouhan | |

(Continued)

OTHER PUBLICATIONS

Thomas Steiner, "Automatic Multi Language Program Library Generation for REST APIs" (Year: 2007).*

(Continued)

*Primary Examiner* — Phillip H Nguyen
(74) *Attorney, Agent, or Firm* — Kilpatrick Townsend & Stockton LLP (57) ABSTRACT

Code for an application programming interface (API) can be automatically generated. For example, a processing device can receive a definition data describing functional and behavioral characteristics of the API in an API description language. The processing device can also receive a template data defining code logic for the API. The template data can include (i) template code in a template language, and (ii) program code in a programming language that is different from the template language and the API description language. The processing device can generate source code in the programming language using the template data and the definition data by performing operations in accordance with the template code. The operations can include at least replacing template variables with corresponding values from the definition file. The processing device can then compile the source code into an executable file, and execute the executable file to implement the API.

20 Claims, 6 Drawing Sheets

(56) References Cited

U.S. PATENT DOCUMENTS

| | | | | |
|---|---|---|---|---|
| 2006/0156314 | A1* | 7/2006 | Waldorf | G06F 9/4484 |
| | | | | 719/328 |
| 2009/0327994 | A1* | 12/2009 | Christensen | G06F 8/10 |
| | | | | 717/106 |
| 2010/0083287 | A1* | 4/2010 | Maximilien | G06F 8/31 |
| | | | | 719/328 |
| 2012/0254830 | A1* | 10/2012 | Conrad | G06F 11/3604 |
| | | | | 717/106 |
| 2014/0033170 | A1* | 1/2014 | Nimashakavi | G06F 16/972 |
| | | | | 717/120 |
| 2014/0372970 | A1 | 12/2014 | Broussard et al. | |
| 2015/0186193 | A1* | 7/2015 | Jain | G06F 9/541 |
| | | | | 719/328 |
| 2015/0295983 | A1* | 10/2015 | Hu | H04L 67/02 |
| | | | | 719/329 |
| 2016/0004729 | A1* | 1/2016 | Evans | G06F 16/212 |
| | | | | 707/803 |

OTHER PUBLICATIONS

Petri Rantanen, "REST API Example Generation Using Javadoc" (Year: 2017).*

Chowdhury, S.R., "Swagger2—Spring Boot REST API Code Generation," Mar. 12, 2018, https://howtodoinjava.com/swagger2/code-generation-for-rest-api/.

Slee, M. et al., "Thrift: Scalable Cross-Language Services Implementation," Facebook, 2007, https://thrift.apache.org/static/files/thrift-20070401.pdf.

Sohan, S.M. et al., "SpyREST in Action: An Automated RESTful API Documentation Tool," IEEE, 2015, http://homepages.ecs.vuw.ac.nz/~craig/publications/ase2015-sohan-demo.pdf.

Steiner, T., "Automatic Multi Language Program Library Generation for REST APIs," Google, Jun. 2007, https://docs.google.com/document/d/1uydmzsDFIiw8OsoMdk5v_s1VW7wrujUmGdUU2zzge0fs/edit.

Wikipedia, Template processor, https://en.wikipedia.org/wiki/Template_processor.

* cited by examiner

```
basePath: "/api"
schemes:
  - "http"
consumes:
  - "application/json"
produces:
  - "application/json"
paths:
  /pets:
    get:
      description: "Returns all pets accessible to a user"
      operationId: "findPets"
      produces:
        - "application/json"
        - "application/xml"
        - "text/xml"
        - "text/html"
      parameters:
        -
          name: "tags"
          in: "query"
          description: "tags to filter by"
          required: false
          type: "array"
          items:
            type: "string"
          collectionFormat: "csv"
        -
          name: "limit"
          in: "query"
          description: "maximum number of results to return"
          required: false
          type: "integer"
          format: "int32"
      responses:
        "200":
          description: "pet response"
          schema:
            type: "array"
            items:
              $ref: "#/definitions/Pet"
        default:
          description: "unexpected error"
          schema:
            $ref: "#/definitions/ErrorModel"
    post:
      description: "Creates a new pet."
      operationId: "addPet"
      produces:
        - "application/json"
      parameters:
        ...
      responses:
        ...
  /pets/{id}:
    delete:
      description: "deletes a single pet based on the ID supplied"
      operationId: "deletePet"
      parameters:
        ...
      responses:
        ...
definitions:
  Pet:
    type: "object"
    allOf:
      -
        $ref: "#/definitions/NewPet"
      -
        required:
          - "id"
        properties:
          id:
            type: "integer"
            format: "int64"
  NewPet:
    type: "object"
    required:
      - "name"
    properties:
      name:
        type: "string"
      tag:
        type: "string"
      ...
```

FIG. 2

```
import flask app = flask.Flask(__name__)

{% for path, pathitem in paths.iteritems() %}

{% for method, operation in pathitem.iteritems() %}

@app.route({{ [basePath, path]|join|replace('{', '<')|replace('}', '>') }}, methods=['{{ method }}'])

def route{{ path|replace('/', '_')|replace('{', '_')|replace('}', '_') }}_{{ method }}():
         # insert business logic for {{ method }} on {{ path }} here
         return "Not Implemented", 501

{% endfor %}

{% endfor %}
```

AUTOMATICALLY GENERATING CODE FOR APPLICATION PROGRAMMING INTERFACES

TECHNICAL FIELD

The present disclosure relates generally to software development and code generation. More specifically, but not by way of limitation, this disclosure relates to automatically generating code for application programming interfaces.

BACKGROUND

Application programming interfaces (API) are clearly defined interfaces for enabling communication between software components. One type of API is a web API in which communication between software components takes place using the Internet and Web-specific protocols. Some web APIs are built according to the representational state transfer (REST) architectural style, which defines a set of constraints and properties based on the hypertext transfer protocol (HTTP).

There are a variety of resources for facilitating the creation of APIs. For example, there are several API description languages (or "description languages") that have been developed to provide a relatively standardized and structured description of the functional and expected behavior of an API. Examples of description languages can include the Web Services Description Language (WSDL), the Web Application Description Language (WADL), the OpenAPI specification, the RESTful Service Description Language (RSDL), and the RESTful API modeling language (RAML).

DETAILED DESCRIPTION

There can be disadvantages to using a description language to design an application programming interface (API). For example, description languages are designed to minimize development time for an API. To this end, description languages are often purposefully limited and inflexible. But this reduces the customizability of the API. As another example, description languages are also generally incapable of being directly compiled, and must be converted into compilable source-code by separate tools. These tools typically include generic features that are preset by the tool's developers, as opposed to being specifically tailored for the individual design-considerations, environment, or purpose of the API. Examples of such generic features can include preset parameter values, predesigned decision trees, and premade code segments. As a result, these tools often produce source code that is rigid, verbose, over-inclusive or under-inclusive, unstable, or otherwise suboptimal. This can result in a variety of problems during runtime, such as unnecessary memory consumption, reduced processor performance, and errors.

Some examples of the present disclosure can overcome one or more of the abovementioned problems by using a code-generation engine that is capable of automatically (e.g., with little or no human involvement) generating source code for an API based on (i) definition data that describes the functional and behavioral characteristics of the API in a description language, and (ii) template data that defines code logic for the API in a template language (or "templating language"). The template data can be user-generated and provide an additional level of flexibility and customization. The code-generation engine can use the template data in conjunction with the definition data to produce more precise, tailored, and customized source code for the API.

As a particular example, a user may wish to create an API for a website. So, the user can obtain (e.g., download or create) definition data that describes basic features of the API using the OpenAPI™ description language. For example, the definition data can specify various paths for the API; how the API is to handle GET, POST, DELETE, or other requests; and object definitions. The user can also obtain template data for the API. The template data can include template code defined using a template language, such as Jinja, GO, or Amber. One example of template code can include template variables that serve as placeholders for corresponding values in the definition file. Another example of template code can include template statements. Template statements can involve, for example, functions, includes, conditional includes, loops, error handlers, or any combination of these. In addition to the template code, the template data can also include program code in a compilable programming-language (e.g., Python, C++, or Java) that is different from the template language. For example, the template file can include program code in Python that define a function having a particular return-value. The user can customize the template code and program code as desired.

The user can then execute the code-generation engine. The code-generation engine can perform one or more operations (e.g., substitutions, copies, insertions, or deletions) based on the template code. For example, the code-generating engine can generate base code from the template data. The code-generation engine can then insert multiple copies of the program code into the base code in accordance with template code defining a "for loop" that iteratively includes the program code. Additionally or alternatively, the code-generation engine can replace the template variables in the base code with corresponding values in the definition data. The code-generation engine can automatically traverse through the template code and modify the base code in accordance with the template code. The result can be source code for the API.

The source code can be structured according to the template data, and can have one or more values as specified in the definition data. In some examples, the source code can be substantially free from the template code. For example, all of the template variables may have been replaced with values from the definition data. And all of the template statements may have been replaced with program code (or deleted after performing corresponding operations). As a result, the source code can exclude all of the template code and instead be substantially in the programming language.

In some examples, the code-generation engine can translate the source code from one programming language into another programming language. For example, the user may have drafted the program code (in the template data) in Python, since Python is more readable and writable than other languages, such as C++. This may result in the code-generation engine initially generating the source code in Python. But the user may wish for the source code to be in C++, which is more compact and faster at runtime than Python source code. So, the user can provide input indicating that the source code is to be converted into C++. Based on the input, the code-generation engine can automatically convert the source code from Python to C++. In this manner, the positive aspects of Python and C++ can be leveraged, while the negative aspects can be avoided. Once the code-generation engine generates the source code in the desired programming language, the source code can be compiled into an executable file for implementing the API.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
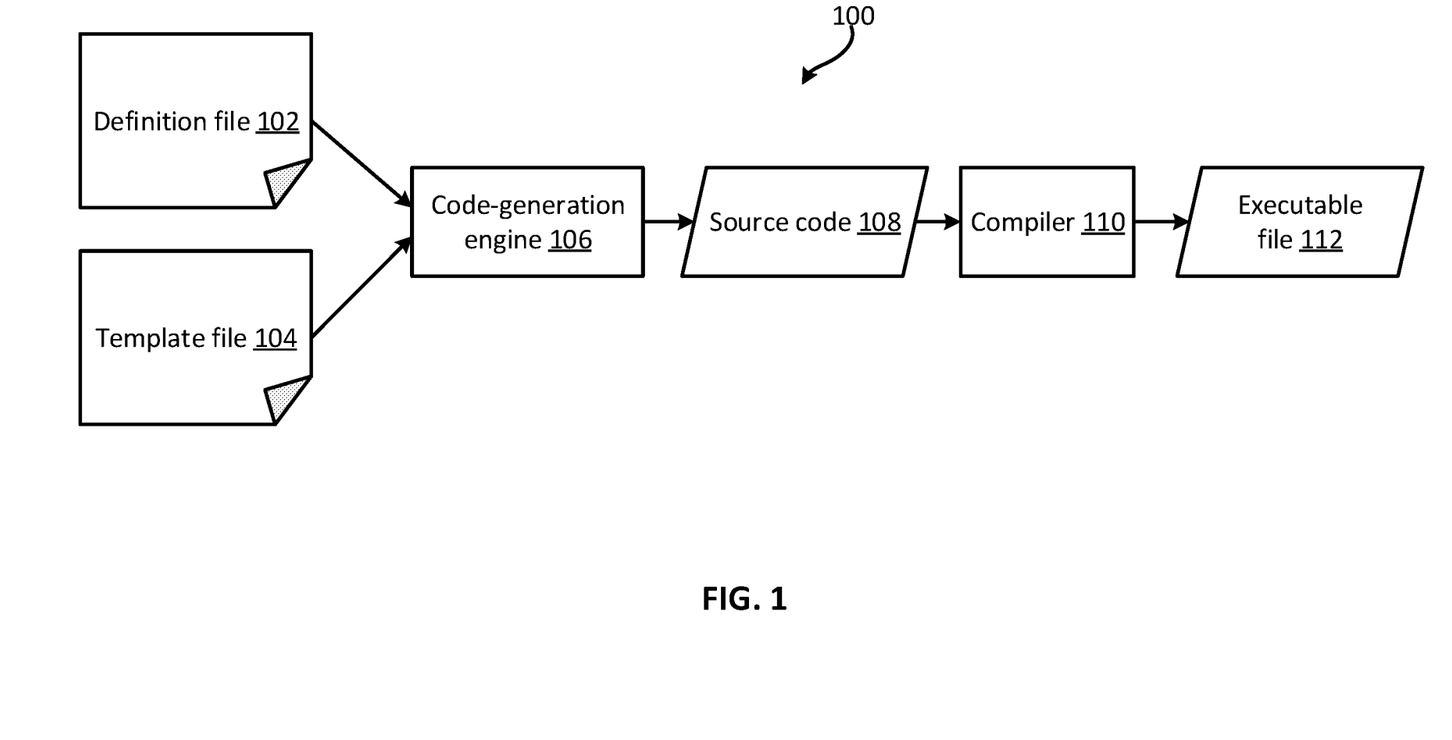
FIG. 1 is a block diagram of an example of a system for automatically generating code for an application programming interface (API) according to some aspects.

FIG. 1 is a block diagram of an example of a system 100 for automatically generating code for an API according to some aspects. The system 100 includes a code-generation engine 106 that can receive a definition file 102 and a template file 104 and automatically generate source code 108 for an API based on the definition file 102 and the template file 104. The code-generation engine 106 can be a software application, a hardware component, or a combination thereof.

Figure 2:
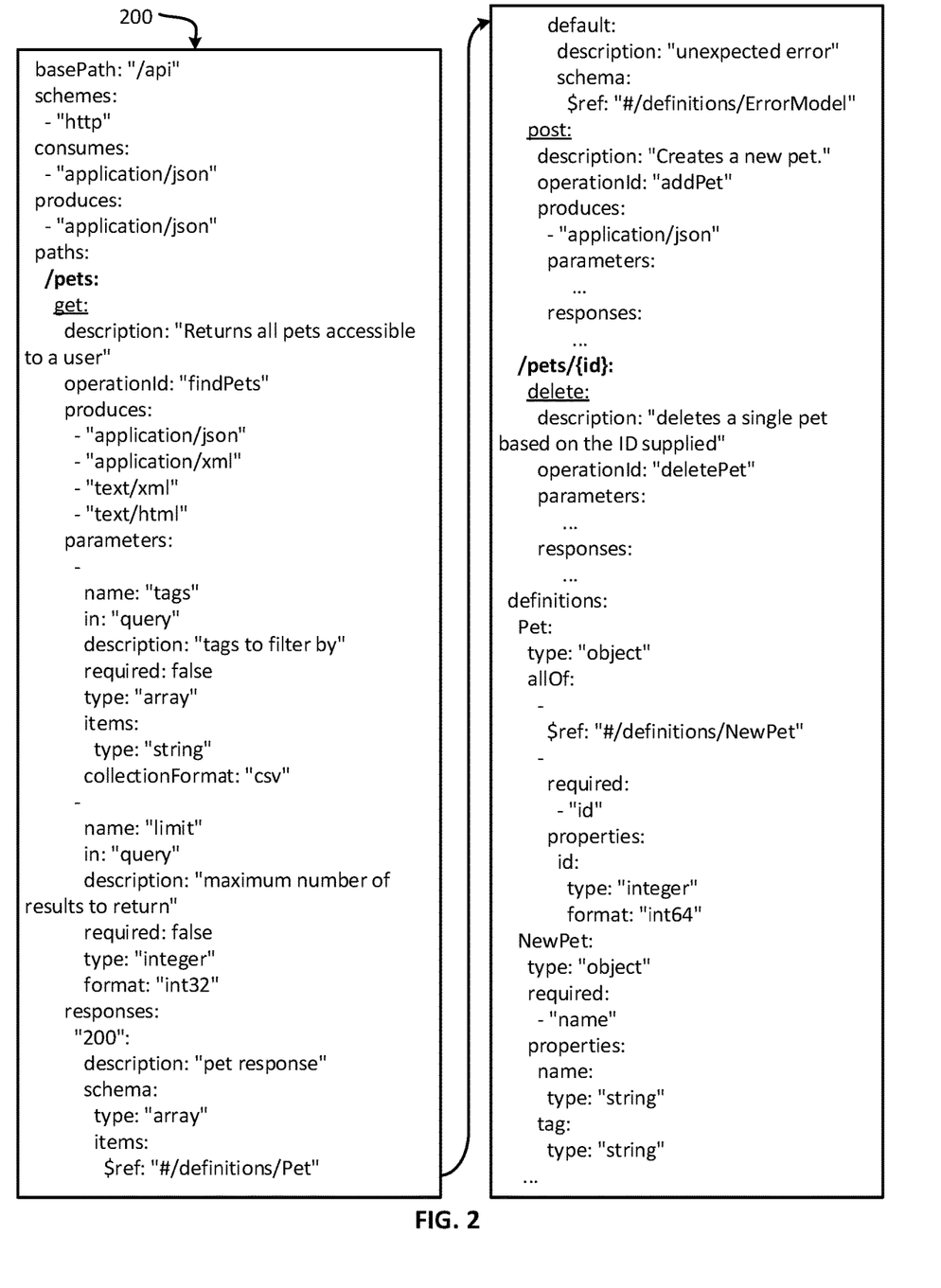
FIG. 2 is an example of definition data according to some aspects.

The definition file 102 can describe the API's services using a description language. The description language can be in a human-readable format that is not capable of being compiled (e.g., as opposed to source code or compiled program-code). For example, the description language can be in a YAML format or a JSON format, and the definition file 102 can be a YAML file or a JSON file, respectively. One example of definition data 200 in the definition file 102 is shown in FIGS. 2A-B. As shown, the definition data 200 defines various paths for the API (e.g., basePath and other paths, which are bolded). The definition data 200 also defines requests (e.g., GET, POST, and DELETE) and corresponding responses for each path. The definition data 200 also includes "definitions" defining various objects, such as the Pet object and the NewPet object. Some of the definition data 200 in FIGS. 2A-B has been replaced with " . . . " for simplicity.

Figure 3:
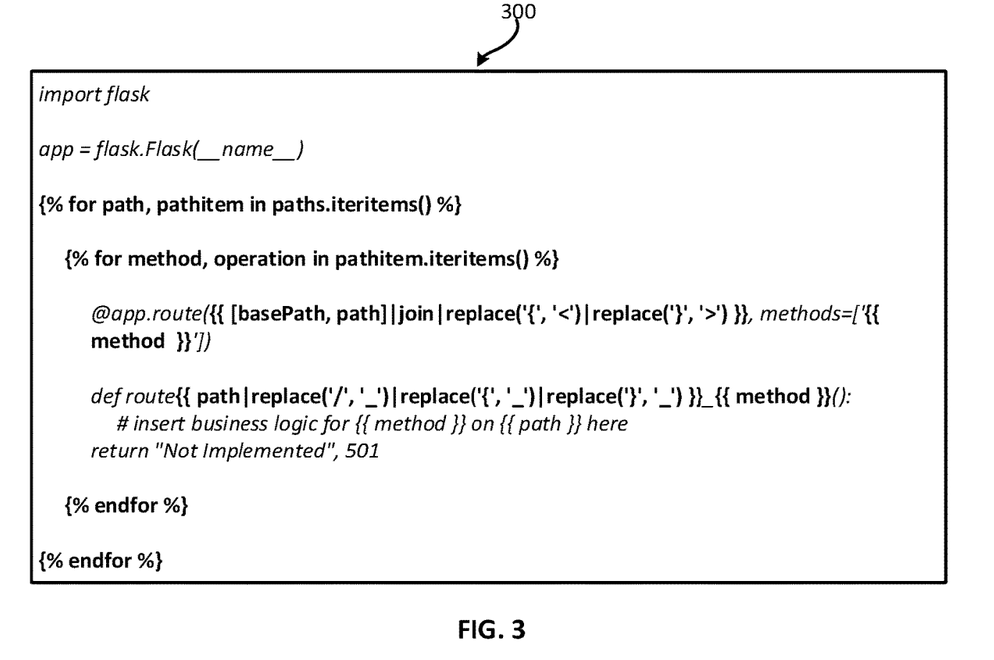
FIG. 3 is an example of template data according to some aspects.

The template file 104 can include template code in a template language, which may or may not be a scripting language. The template language can be in a human-readable format that is not capable of being compiled. One example of template data 300 in the template file 104 is shown in FIG. 3. The template data 300 includes template code, such as the template statements shown in bold. In this example, the template statements include an outer for loop for traversing through each path specified in the definition file 102. The template statements also include an inner for loop for traversing through each request type (or "method") specified in the definition file 102. The template statements are delineated in this example starting with "{%" and ending with "%}". The template code also includes template variables. The template variables can serve as placeholders for corresponding values in the definition file 102. The template variables are delineated in this example starting with "{{" and ending with "}}", such as with "{{method}}" in FIG. 3. Some template code can involve a mix of template statements and template variables, such as "{{[basePath, path]|join|replace('{', '<')|replace('}', '>') }}," which includes a mix of both template variables (e.g., basePath and path) and template statements (e.g., template commands such as join and replace). In some examples, the template file 104 can also include program code in a programming language, such as Python. Examples of the program code are shown in italics in FIG. 3. The template data can intermix program code and template code to define the code logic for the API.

Figure 4:
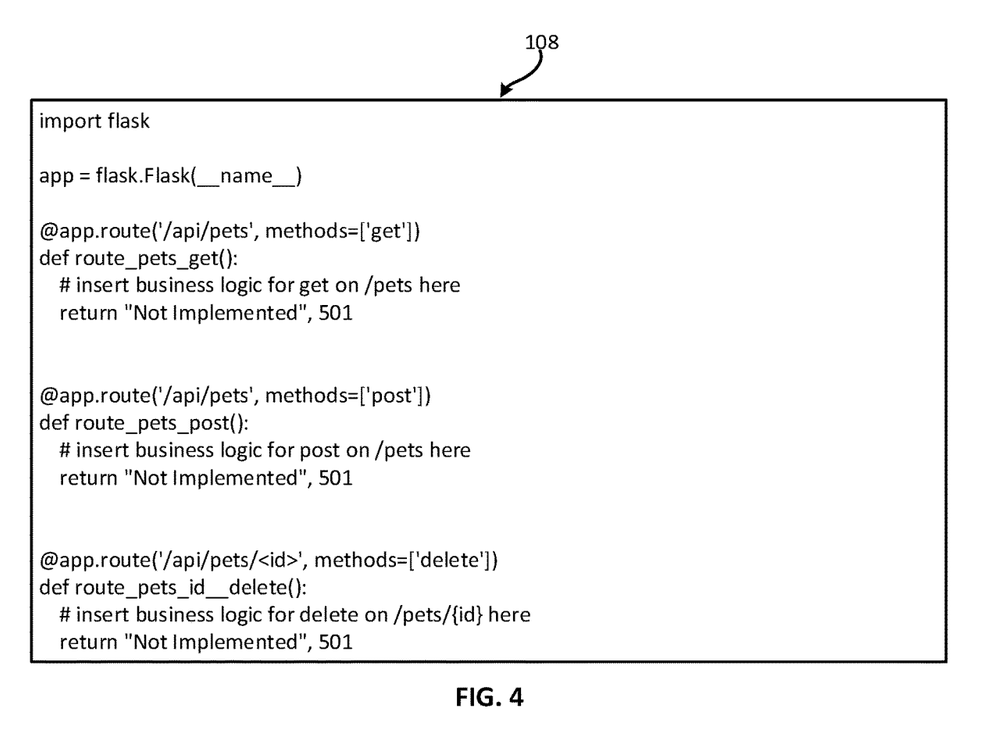
FIG. 4 is an example of source code according to some aspects.

The code-generation engine 106 can receive the template data (e.g., from the template file 104) and generate base code from it. For example, the code-generation engine 106 can extract the template data from the template file 104 and use the template data as the base code. The code-generation engine 106 can then step through the base code and perform operations in accordance with the template statements in the base code. For example, the code-generation engine 106 can expand the base code by inserting copies of program code into the base code in accordance with a loop in the template code. The code-generation engine 106 can also replace the template variables in the base code with corresponding values from the definition data. At the end of this process, the code-generation engine 106 will have modified the base code into source code 108 for the API. One example of source code 108 generated using the definition data 200 and template data 300 is shown in FIG. 4. As shown, the source code 108 includes multiple copies of the program code in the template data 300 as a result of the for loop in the template code. The source code 108 also has the template variables replaced with corresponding values from the definition data 200, such as "api/pets" and "api/pets/<id>." This source code 108 may be a code skeleton that is structured according to the template data 300. And, as shown, the code skeleton includes commented portions indicating where additional program code can be manually inserted by a developer of the API. Because the program code in the template data 300 in FIG. 3 is in the Python language, the source code 108 is also in the Python language.

In some examples, it may be desirable to translate the source code 108 into another programming language, such as Java, before the source code 108 is compiled. In some such examples, the code-generation engine 106 can translate the source code 108 into one or more other programming languages. For example, a user can input a particular programming-language into which to translate the source code 108. The code-generation engine 106 can receive the input and, based on the input, translate the source code 108 into the particular programming language. To effectuate this translation, the code-generation engine 106 can include one or more databases, libraries, or decision trees. In one example, the code-generation engine 106 can include a database that has relationships between code segments in various programming languages. In another example, the code-generation engine 106 can rely on one or more libraries for converting the syntax of one programming language into another syntax for another programming language. Any number and combination of techniques can be used to perform this conversion.

After producing the source code 108 (e.g., in the desired programming-language), a compiler 110 can compile the source code 108 into an executable file 112. The executable file 112 can include machine-executable instructions (e.g., as opposed to human-readable code). The executable file 112 can then be executed to implement the API.

The system 100 shown in FIG. 1 is for illustrative purposes, and other examples can include more components, fewer components, or different combinations of components than shown in FIG. 1. For example, although the code-generation engine 106 and the compiler 110 are shown as separate components in FIG. 1, in other examples the code-generation engine 106 can include the compiler (e.g., can perform the functionality of the compiler). Likewise, although the definition file 102 and the template file 104 are shown as separate files, in other examples the information in these files can be combined into a single file that includes the definition data and the template data. Also, although one definition file 102 and one template file 104 is shown in FIG. 1, the definition file 102 can represent any number and combination of definition files and the template file can represent any number and combination of template files (e.g., generated by any number and combination of users). Further, the definition data 200 in FIG. 2, template data 300 in FIG. 3, and source code 108 in FIG. 4 are illustrative, and other examples can include different data or arrangements of the data therein.

Figure 5:
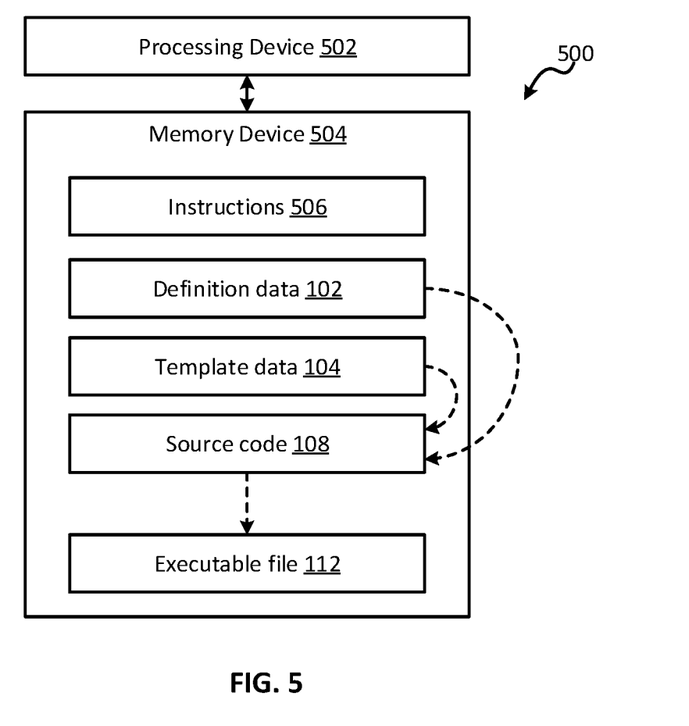
FIG. 5 is a block diagram of another example of a system for automatically generating code for an API according to some aspects.

FIG. 5 is a block diagram of an example of another system 500 for automatically generating code for application programming interfaces. The system 500 includes a processing device 502 communicatively coupled to a memory device 504. The processing device 502 can include one processing device or multiple processing devices. Non-limiting examples of the processing device 502 include a Field-Programmable Gate Array (FPGA), an application-specific integrated circuit (ASIC), a microprocessor, etc.

The processing device 502 can execute one or more operations for automatically generating code for application programming interfaces. The processing device 502 can execute instructions 506 stored in the memory device 504 to perform the operations. In some examples, the instructions 506 can include processor-specific instructions generated by a compiler or an interpreter from code written in any suitable computer-programming language, such as C, C++, C#, etc.

Memory device 504 can include one memory device or multiple memory devices. The memory device 504 can be non-volatile and may include any type of memory device that retains stored information when powered off. Non-limiting examples of the memory device 504 include electrically erasable and programmable read-only memory (EEPROM), flash memory, or any other type of non-volatile memory. In some examples, at least some of the memory device 504 can include a medium from which the processing device 502 can read instructions 506. A computer-readable medium can include electronic, optical, magnetic, or other storage devices capable of providing the processing device with computer-readable instructions or other code. Non-limiting examples of a computer-readable medium include magnetic disk(s), memory chip(s), ROM, random-access memory (RAM), an ASIC, a configured processor, optical storage, or any other medium from which a computer processor can read instructions.

In some examples, the memory device 504 can include definition data 508, template data 510, and source code 512 generated from the definition data 508 and the template data 510 (e.g., as indicated by the dashed lines). The memory device 504 can also include an executable file 514 generated by compiling the source code 512.

Figure 6:
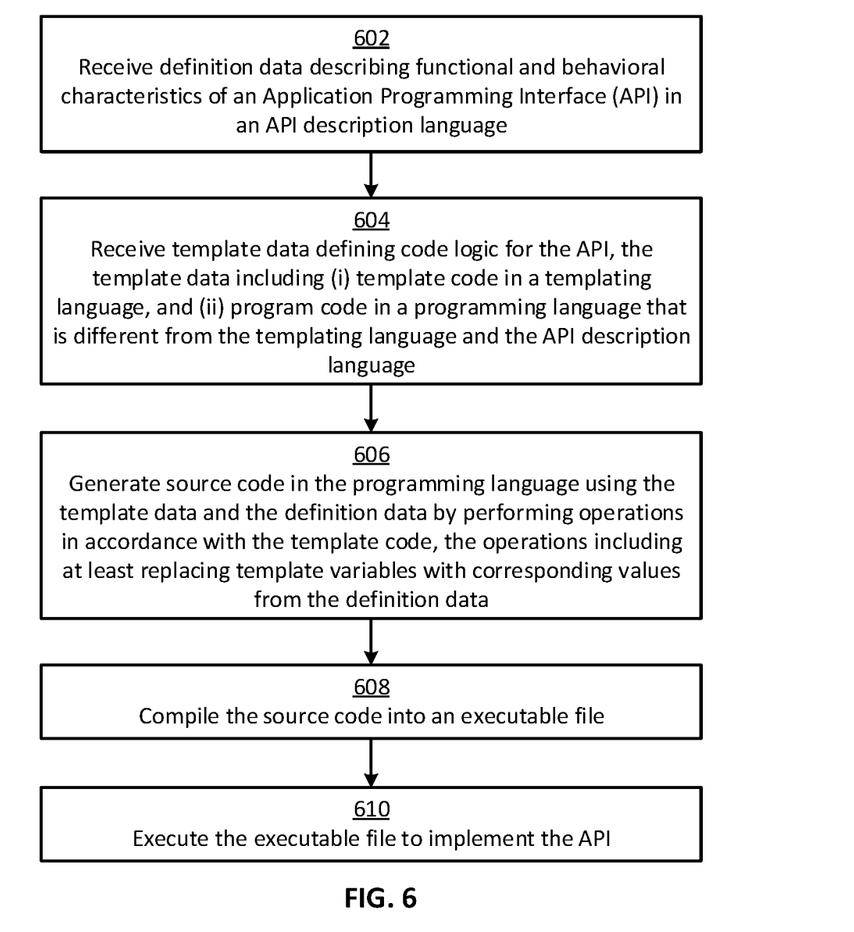
FIG. 6 is a flow chart of an example of a process for automatically generating code for an API according to some aspects.

In some examples, the processing device 502 can implement some or all of the steps shown in FIG. 6. In other examples, the processing device 502 can implement more steps, fewer steps, different steps, or a different combination of the steps shown in FIG. 6. The steps of FIG. 6 are described below with reference to components of FIG. 4 described above.

In block 602, the processing device 502 receives definition data 508 describing functional and behavioral characteristics of an API in an API description language. The API description can be, for example, OpenAPI. The processing device 502 can receive the definition data 508 from a definition file, from a remote computing device, or from another source.

In block 604, the processing device 502 receives template data 510 defining code logic for the API. The template data 510 can include (i) template code in a template language, and (ii) program code in a programming language. The programming language can be different from the template language and the API description language. The processing device 502 can receive the template data 510 from a template file, from a remote computing device, or from another source.

In block 606, the processing device 502 generates source code 512 in the programming language using the template data 510 and the definition data 508. The processing device 502 can generate the source code 512 by performing one or more operations in accordance with template code in the template data 510. The operations can include at least replacing template variables with corresponding values from the definition data.

In some examples, the processing device 502 can generate the source code 512 at least in part by mapping various portions of the definition data 508, template data 510, or both to predefined code-segments to be incorporated into the source code 512 using a database. The processing device 502 may be able to select among several predefined code-segments based on the characteristics of the definition data 508, template data 510, or both.

In block 608, the processing device 502 compiles the source code 512 into an executable file 514. The processing device 502 can use a compiler to compile the source code 512 into the executable file 514.

In block 610, the processing device 502 executes the executable file 514 to implement the API.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A system comprising:
a processing device; and
a memory device including instructions that are executable by the processing device for causing the processing device to:
  receive definition data describing functional and behavioral characteristics of an Application Programming Interface (API) in an API description language;
  receive template data defining code logic for the API, the template data including (i) template code in a template language, and (ii) program code in a programming language that is different from the template language and the API description language;
  generate source code in the programming language using the template data and the definition data by performing operations in accordance with the template code, the operations including at least replacing template variables with corresponding values from the definition data;
compile the source code into an executable file; and
execute the executable file to implement the API.

2. The system of claim 1, wherein the API is a Representational State Transfer (REST) API, the API description language is OpenAPI, and the template language is Jinja.

3. The system of claim 1, wherein:
the source code excludes the template code;
the source code is entirely in the programming language; and
the programming language is capable of being compiled by a compiler into the executable file.

4. The system of claim 1, wherein the source code is a code skeleton that is structured according to the template data, the code skeleton having commented portions indicating that additional program code is to be manually inserted.

5. The system of claim 1, wherein the memory device further comprises instructions that are executable by the processing device for causing the processing device to generate the source code by:
generating base code by extracting the template data from a template file;
expanding the base code by inserting at least one copy of the program code into the base code in accordance with a loop expressed in the template code to generate expanded code; and
subsequent to generating the expanded code, replacing the template variables in the base code with the corresponding values from the definition data to generate the source code.

6. The system of claim 1, wherein the memory device further comprises instructions that are executable by the processing device for causing the processing device to:
receive user input, via an input device, indicating that the source code is to be provided in a particular programming-language; and
in response to receiving the user input and subsequent to generating the source code, translate the source code from the programming language into the particular programming-language,
wherein the source code in the particular programming-language is compiled into the executable file.

7. The system of claim 1, wherein the memory device further comprises instructions that are executable by the processing device for causing the processing device to obtain the template data by extracting the template data from a plurality of template files generated by one or more users.

8. A method comprising:
receiving, by a processing device, definition data describing functional and behavioral characteristics of an Application Programming Interface (API) in an API description language;
receiving, by the processing device, template data defining code logic for the API, the template data including (i) template code in a template language, and (ii) program code in a programming language that is different from the template language and the API description language;
generating, by the processing device, source code in the programming language using the template data and the definition data by performing operations in accordance with the template code, the operations including at least replacing template variables with corresponding values from the definition data;
compiling, by the processing device, the source code into an executable file; and
executing, by the processing device, the executable file to implement the API.

9. The method of claim 8, wherein the API is a Representational State Transfer (REST) API, and the API description language is OpenAPI.

10. The method of claim 8, wherein:
the source code excludes the template code; and
the source code is entirely in the programming language.

11. The method of claim 8, wherein the source code is a code skeleton that is structured according to the template data, the code skeleton having commented portions indicating that additional program code is to be manually inserted.

12. The method of claim 8, further comprising generating the source code by:
generating base code by extracting the template data from a template file;
expanding the base code by inserting at least one copy of the program code into the base code in accordance with a loop expressed in the template code to generate expanded code; and
subsequent to generating the expanded code, replacing the template variables in the base code with the corresponding values from the definition data to generate the source code.

13. The method of claim 8, further comprising:
receiving user input, via an input device, indicating that the source code is to be provided in a particular programming-language; and
in response to receiving the user input and subsequent to generating the source code, translating the source code from the programming language into the particular programming-language.

14. The method of claim 8, further comprising obtaining the template data by extracting the template data from a plurality of template files generated by one or more users.

15. A non-transitory computer-readable medium comprising instructions that are executable by a processing device for causing the processing device to:
receive definition data describing functional and behavioral characteristics of an Application Programming Interface (API) in an API description language;
receive template data defining code logic for the API, the template data including (i) template code in a template language, and (ii) program code in a programming language that is different from the template language and the API description language;
generate source code in the programming language using the template data and the definition data by performing operations in accordance with the template code, the operations including at least replacing template variables with corresponding values from the definition data;
compile the source code into an executable file; and
execute the executable file to implement the API.

16. The non-transitory computer-readable medium of claim 15, wherein the API is a Representational State Transfer (REST) API.

17. The non-transitory computer-readable medium of claim 15, wherein:
the source code excludes the template code; and
the source code is substantially in the programming language.

18. The non-transitory computer-readable medium of claim 16, wherein the source code is a code skeleton that is structured according to the template data.

19. The non-transitory computer-readable medium of claim 15, further comprising instructions that are executable by the processing device for causing the processing device to generate the source code by:
   generating base code by extracting the template data from a template file;
   expanding the base code by inserting at least one copy of the program code into the base code in accordance with a loop expressed in the template code to generate expanded code; and
   subsequent to generating the expanded code, replacing the template variables in the base code with the corresponding values from the definition data to generate the source code.

20. The non-transitory computer-readable medium of claim 15, further comprising instructions that are executable by the processing device for causing the processing device to:
   receive user input, via an input device, indicating that the source code is to be provided in a particular programming-language; and
   in response to receiving the user input and subsequent to generating the source code, translate the source code from the programming language into the particular programming-language.

* * * * *